(12) United States Patent
Yonezawa et al.

(10) Patent No.: US 6,205,974 B1
(45) Date of Patent: Mar. 27, 2001

(54) DIRECT INJECTED CYLINDER HEAD

(75) Inventors: Minoru Yonezawa; Yuji Kinoshita, both of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/391,644

(22) Filed: Sep. 7, 1999

(30) Foreign Application Priority Data

Sep. 8, 1998 (JP) .................................................. 10-253567

(51) Int. Cl.⁷ ....................................................... F02B 23/10
(52) U.S. Cl. ......................................... 123/305; 123/193.5
(58) Field of Search ................................. 123/193.5, 294, 123/295, 302, 305

(56) References Cited

U.S. PATENT DOCUMENTS

| | | | |
|---|---|---|---|
| 4,506,645 | * | 3/1985 | Hewlitt et al. .................... 123/305 X |
| 5,816,215 | * | 10/1998 | Yoshikawa et al. .............. 123/305 X |

* cited by examiner

*Primary Examiner*—Tony M. Argenbright
(74) *Attorney, Agent, or Firm*—Knobbe, Martens, Olson & Bear LLP

(57) ABSTRACT

A cylinder head construction for a direct injected internal combustion engine wherein a spark plug well is formed in the cylinder head and penetrates through its combustion chamber surface at the periphery of the combustion chamber. The opening of the nozzle receiving portion of the this well is relieved around the outer peripheral portion thereof so as to avoid the formation of an edge that can deteriorate through cracking.

10 Claims, 4 Drawing Sheets

DIRECT INJECTED CYLINDER HEAD

BACKGROUND OF THE INVENTION

This invention relates to a cylinder head construction for a direct-injected internal combustion engine and more particularly to an improved configuration for the nozzle-receiving opening that receives the fuel injector in the cylinder head.

Because of the potential advantages of better fuel economy and exhaust emission control as well as improved output, direct cylinder fuel injection is being considered for many engine applications. However, when the engine is of the high performance type, the placement of the fuel injector in the cylinder head gives rise to a number of problems, not the least of which is the placement of the fuel injector.

The relationship between the fuel injector and its spray pattern and the spark plug and their relative locations in the cylinder head and combustion chamber are quite important. In a preferred arrangement, the spark plug is generally centrally positioned in the cylinder head and the fuel injector is mounted at a peripheral edge of the combustion chamber recess and injects generally downwardly toward the cylinder bore axis.

This location for the injector means that it should be positioned in such a manner that it does not interfere with the flow passages into the cylinder and out of the cylinder. This is particularly difficult when multi-valve engines are employed, as is typically with the type high performance engine that also would use direct cylinder fuel injection.

With four valve per cylinder engines, it has been proposed to position the fuel injector between and below a pair of like passages that serve the combustion chamber. This generally results in the injector being disposed at a relatively small acute angle to the sealing surface of the cylinder head that engages and seals the cylinder block around the cylinder bore.

Conventionally, the fuel injector is mounted in an injector well formed in the cylinder head which generally is a counter-bored passageway having its smaller diameter portion extending through the combustion chamber surface of the cylinder head.

As a result of this configuration, the opening of this fuel injector well through the cylinder head surface defines a sharp edge, particularly along the radially outermost portion of the combustion chamber surface. This sharp edge is subjected to contractions and expansions when the engine is stopped and started due to the change in temperature and the fact that the cylinder head fasteners are disposed outwardly from this opening. As a result, cracking or erosion is likely to occur at this sharp edge that can give rise to stress effects that are a source of potential damage to the cylinder head.

It is, therefore, a principal object of this invention to provide an improved cylinder head construction for a direct injected internal combustion engine.

It is a further object of this invention to provide an improved fuel injector well arrangement for a cylinder head that permits the desired placement of the fuel injector but eliminates stress risers that can cause potential damage.

It is a further object of this invention to provide an improved spark plug well configuration for a direct injected cylinder head.

SUMMARY OF THE INVENTION

This invention is adapted to be embodied in a cylinder head for a direct injected internal combustion engine. The cylinder head has a lower surface that is adapted to be held in sealing engagement with an associated cylinder block around its cylinder bore. This cylinder head surface is formed with a recessed area that forms, in part, the combustion chamber of the engine. A fuel injector well is formed in the cylinder head and terminates in a cylindrical opening that passes at least in part through the cylinder head combustion chamber surface. The outer peripheral portion of this opening is formed with a relieved part that defines a curved surface that extends at an angle to the well opening so as to define a surface rather than an edge along this portion of the combustion chamber surface of the cylinder head.

DETAILED DESCRIPTION OF THE PREFERRED EMBODIMENTS OF THE INVENTION

Figure 1:
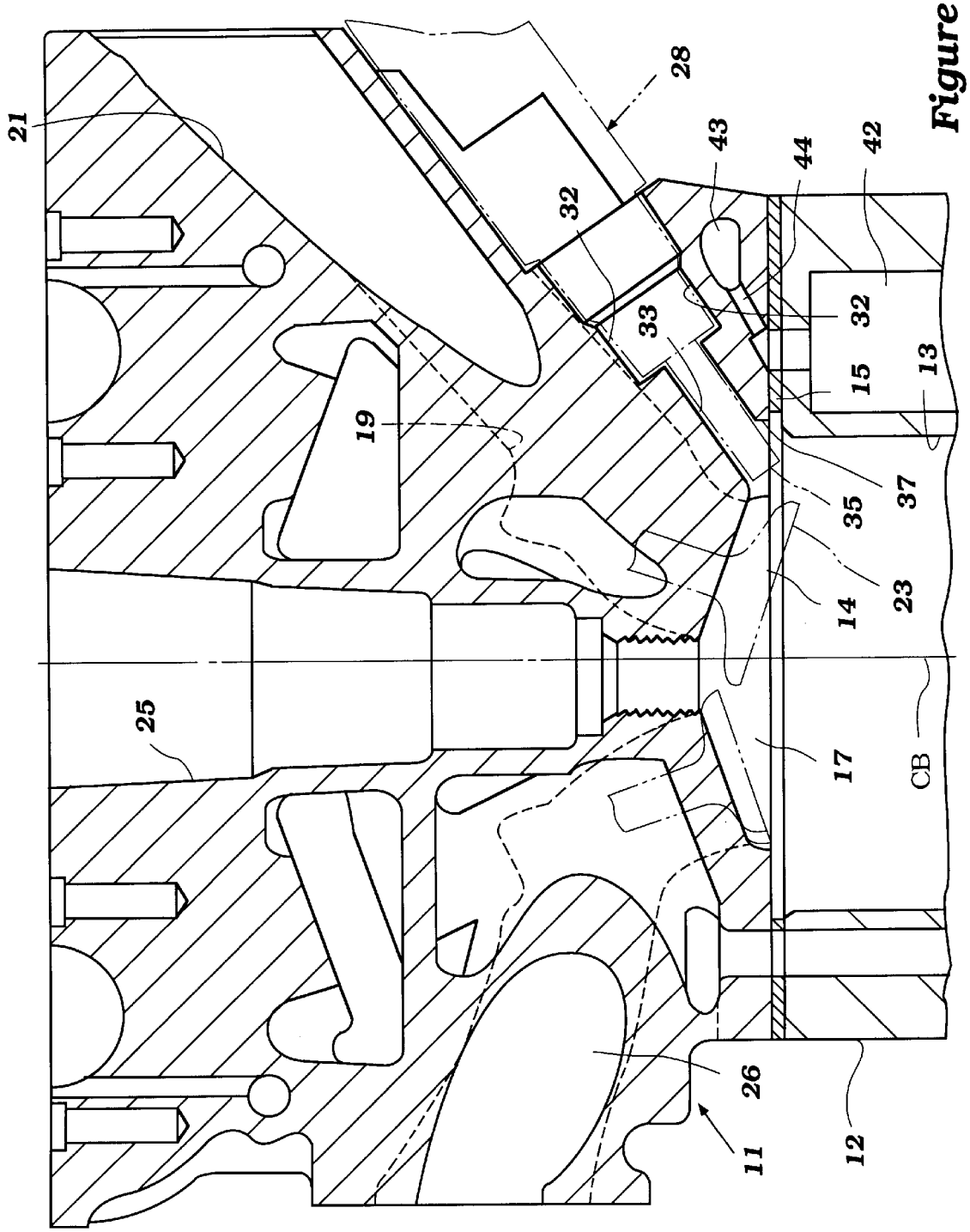
FIG. 1 is a cross-sectional view taken through a portion of an internal combustion engine constructed in accordance with an embodiment of the invention and taken generally along the line 1—1 of FIG. 2.
Figure 2:
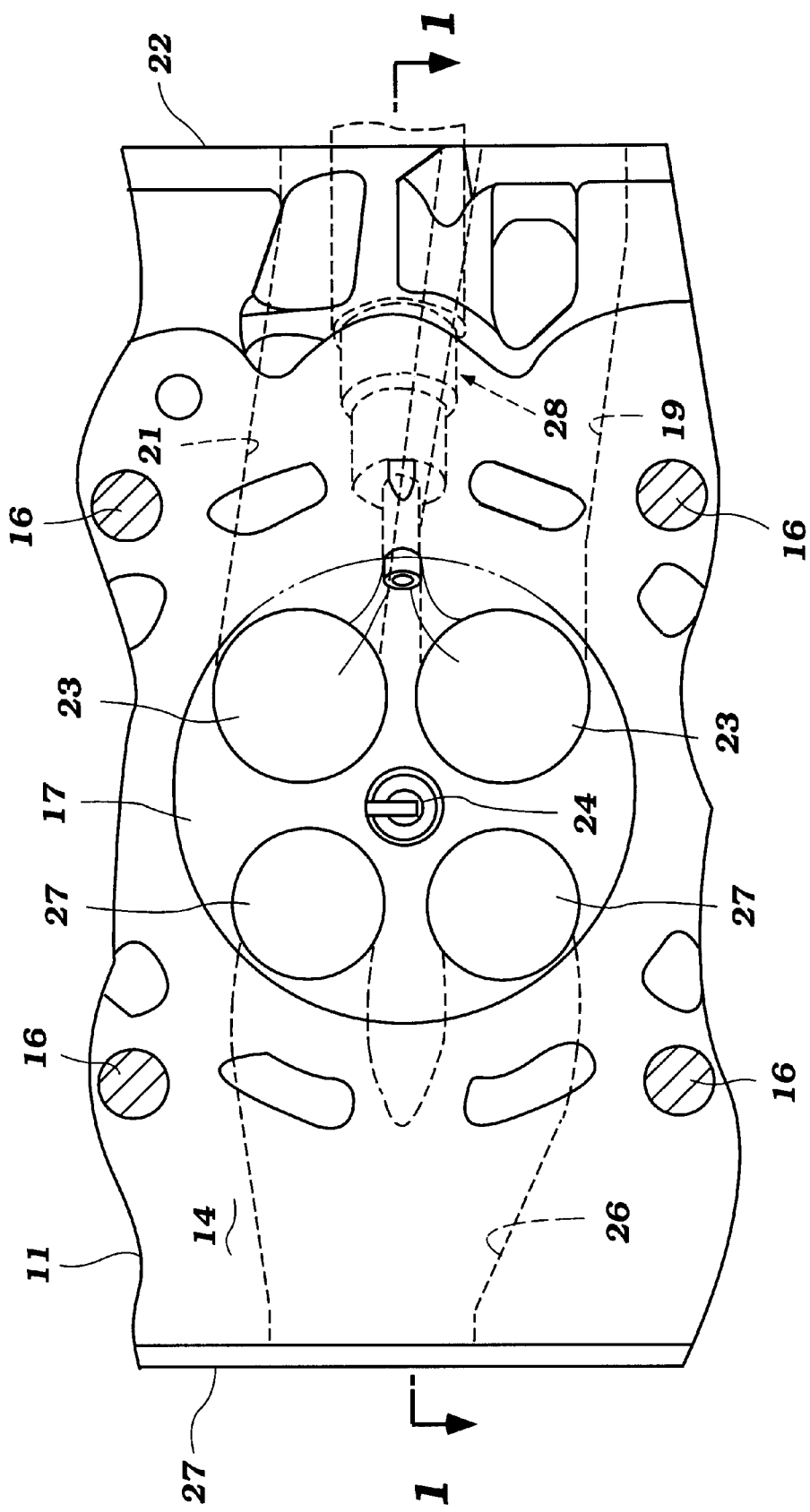
FIG. 2 is a bottom plan view of the cylinder head surface showing the area at one of the cylinder bores.
Figure 3:
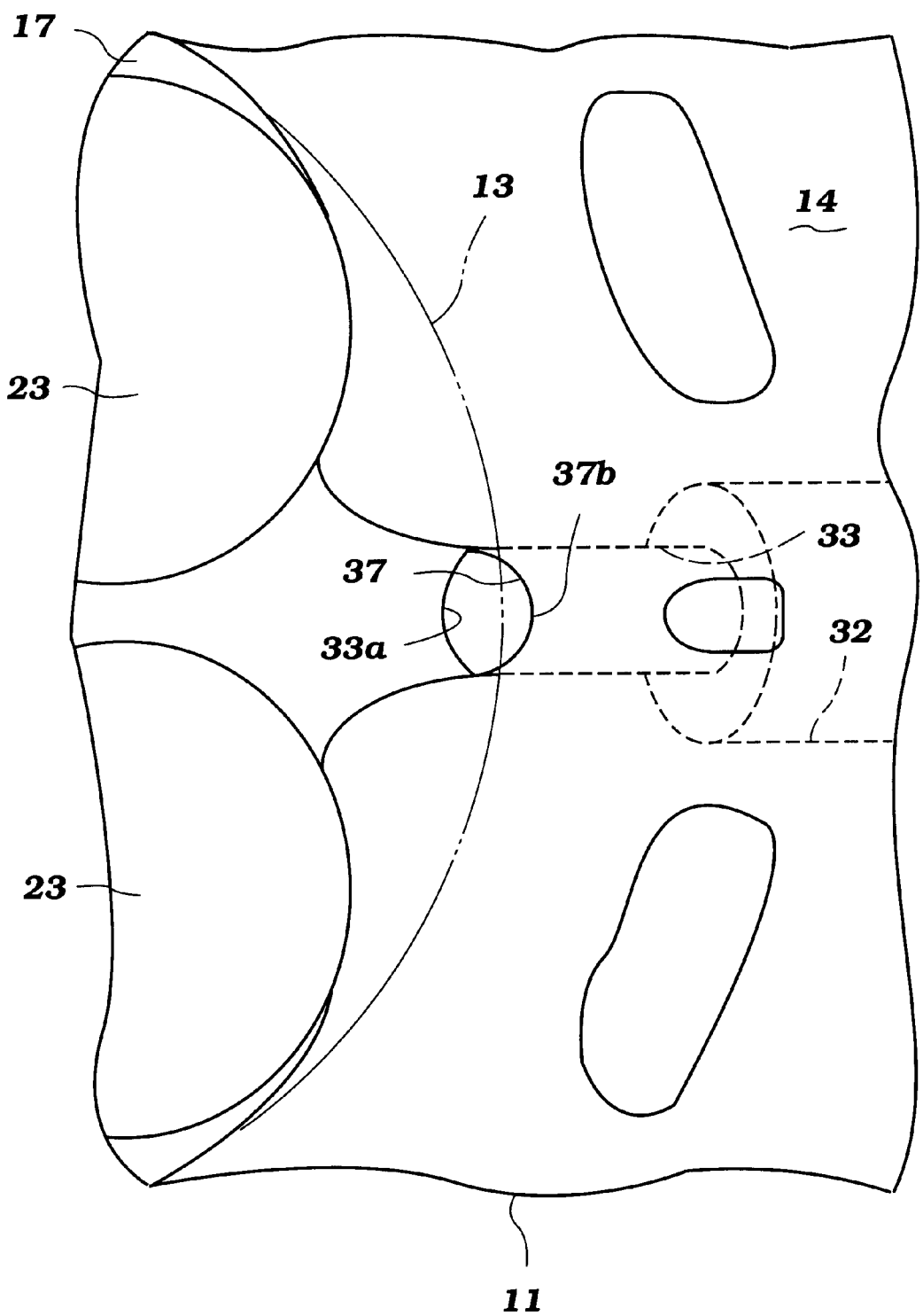
FIG. 3 is an enlarged view looking in the same direction as FIG. 2 and showing generally the area where the fuel injector is mounted in the cylinder head.
Figure 4:
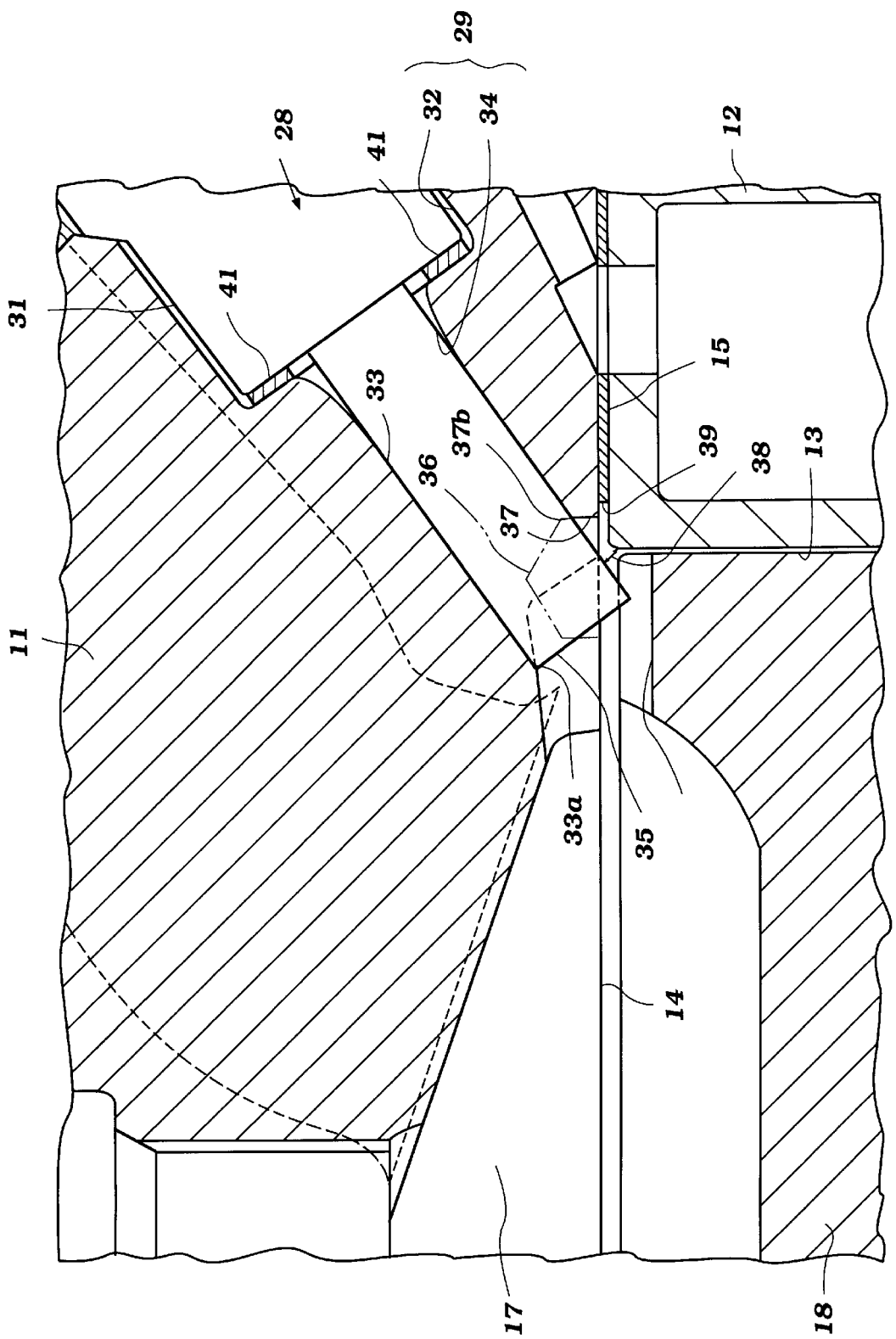
FIG. 4 is an enlarged cross-sectional view taken along the same plane as FIG. 1 and showing the area primarily depicted also in FIG. 3.

Referring now in detail to the drawings, a portion of an internal combustion engine incorporating a cylinder head, indicated generally by the reference numeral 11, is shown in FIGS. 1 and 4. Only the portion associated with a single cylinder of the engine is shown because it is believed that from that description those skilled in the art will readily understand how to practice the invention with engines having a wide variety of configurations and different numbers of cylinders.

The cylinder head 11 is affixed to a cylinder block 12 in sealing relationship to the cylinder bores 13 thereof. The cylinder bore 13 defines a cylinder bore axis CB and the cylinder head 11 has a lower sealing surface 14 that is held in abutting engagement with a cylinder head gasket 15 by means of threaded fasteners 16. The threaded fasteners 16 are disposed at equal distances from the cylinder bore axis CB so as to provide uniform sealing around the cylinder bore 13.

The cylinder head sealing surface 14 surrounds a recess 17 which cooperates with the cylinder bore 13 and the head of a piston 18 that reciprocates in the cylinder bore 13 to form a combustion chamber. At times, the recess 17 will be referred to as the "combustion chamber" since at top dead center position, as seen in FIG. 4, this recess 17 forms a substantial portion of the combustion chamber volume.

An intake passage arrangement comprised of a pair of intake passages 19 and 21 extend through the cylinder head 11 from an outer surface 22 thereof for supplying an air charge to the combustion chamber 17. Preferably, the intake passages 19 and 21 are configured as described in the copending application entitled "Cylinder Head for Direct Injected Engine," Ser. No. 09/382,250, filed Aug. 24, 1999 and assigned to the assignee hereof. Of course, the invention is not so limited to the utilization of such intake passage configuration.

The intake passages 19 and 21 terminate in a pair of valve seats that are valved by the heads of poppet-type intake valves 23. These intake valves 23 are supported for reciprocation in the cylinder head 11 in any suitable manner and are operated by means of an overhead mounted intake cam shaft in a preferred arrangement. Again, however, the invention is not so limited in application.

A spark plug 24 is mounted in a spark plug well 25 formed substantially on the cylinder bore axis CB with its gap disposed substantially at the center of the combustion chamber recess 17. This spark plug 24 is fired by a suitable ignition circuit to ignite the fuel charge which is delivered to the combustion chamber, in a manner to be described.

The burnt charge can exit the cylinder head 11 through an exhaust passage arrangement 26 that extends from exhaust valve seats that are valved by the heads of poppet-type exhaust valves 27. Like the intake valves 23, the exhaust valves 27 are operated in any suitable manner and preferably by an overhead mounted exhaust cam shaft. The intake and exhaust cam shafts are driven by a suitable timing drive at one-half crankshaft speed, in any known manner.

The exhaust passage arrangement 26 exits the cylinder head 11 through an exhaust opening 27 that mates with a suitable exhaust system (not shown) for discharge of the exhaust gases to the atmosphere.

A fuel injector, indicated generally by the reference numeral 28 is mounted in the cylinder head 11 and specifically in an injector well, indicated generally by the reference numeral 29, that is formed therein in a manner now to be described. As previously noted, the fuel injector 28 delivers a fuel charge to the combustion chamber 17.

The fuel injector 28 has a main body portion 31 that is received in a larger diameter bore portion 32 of the fuel injector well 29. A smaller diameter opening 33 having a tapered transition from the larger diameter opening 32, indicated at 34, extends through and penetrates the recess surface 17 of the cylinder head 11. This smaller diameter portion 33 receives the nozzle part 35 of the fuel injector which nozzle part extends or protrudes below the cylinder head sealing surface 14, as best seen in FIGS. 1 and 4.

This nozzle portion 35 supports an injector valve which, when open, permits the fuel to be sprayed into the cylinder bore toward the cylinder bore axis CB. It should be noted that the fuel injector well 29 is disposed at an acute angle to the sealing surface 14 so as to provide minimum obstruction to the intake passages 19 and 21, as described in the aforenoted copending application.

The fuel injector well openings 32 and 33 are formed by drillings and this leaves in the cylinder head surface 17 a generally curved portion 33a which has a somewhat elliptical configuration that has a form that depends upon the angle of the drill. Normally, this would result in a sharp edge at the area where the drill that forms the opening 33 penetrates the cylinder head surface in proximity to the cylinder bore 13. This provides a stress raiser that can in fact result in erosion due to the expansions and contractions when the engine is started and stopped and also due to the heat of combustion.

In accordance with the invention, however, this sharp edge is removed by using a drill or other machine tool, shown in phantom in FIG. 4 and indicated by the reference numeral 36 so as to cutaway this sharp edge and provide a curved surface 37 which, in fact, may be a segment of a circle. Preferably the drill 36 is passed in a direction parallel to the cylinder bore axis CB. This results in an edge surface 37b. However, this edge 37b is protected because of the fact that the nozzle tip 35 extends in close proximity to the upper end of the cylinder bore 13 and leaves only a small gap 38 for heat and flame to reach this edge 37b.

It should be noted that the cylinder head gasket 15 is provided with a relief 39 in this area so as to protect it also from the heat and to avoid its deterioration.

Because of the fact that the nozzle portion 35 of the fuel injector 28 penetrates into the combustion chamber area, the head of the piston 18 is formed with a recess 41 so as to provide adequate clearance from the injector nozzle portion 35.

Although a circular section is formed for the surface 37, it is to be understood that this surface may be inclined at an angle to the cylinder bore axis rather than being parallel to it. The main purpose, however, is to remove the sharp edge at the outer end of the bore 33 on the side radially outwardly from the cylinder bore axis CB.

It should also be noted that the cylinder head 11 is water cooled and has cooling jackets which are supplied in part with coolant from a cylinder block cooling jacket 42 and one of the cylinder head cooling jackets 43 is disposed below the injector nozzle portion 35 so as to cool it. Coolant is delivered to this jacket portion 43 through a drilling 44 formed in the cylinder head 11.

Thus, from the foregoing description it should be readily apparent that the described construction for the cylinder head fuel injector well is such that no sharp edges will be provided in the cylinder head surface where the injector nozzle penetrates it and hence deterioration and cracking of the cylinder head is avoided.

Finally a sealing gasket 41 is interposed between the shoulder formed at the juncture of the bores 32 and 33 of the injector well 29 and the fuel injector 28. This gasket 41 provides a compression seal.

Of course, the foregoing description is that of a preferred embodiment of the invention and various changes and modifications may be made without departing from the spirit and scope of the invention, as defined by the appended claims.

What is claimed is:

1. A cylinder head for a direct injected internal combustion engine, said cylinder head having a lower surface that is adapted to be held in sealing engagement with an associated cylinder block around its cylinder bore, said cylinder head lower surface being formed with a recessed area that forms, in part, the combustion chamber of the engine, and a fuel injector well formed in said cylinder head and terminating in a cylindrical opening that passes at least in part through said cylinder head combustion chamber surface, the inner peripheral portion of said fuel injector well opening at said cylinder head surface being formed with a relieved part that defines a curved surface comprised of a cylindrical segment that extends at an angle to the axis of said well opening so as to define a surface rather than an edge along this portion of the combustion chamber surface of the cylinder head.

2. A cylinder head for a direct injected internal combustion engine as set forth in claim 1 wherein the cylindrical segment has its axis parallel to the axis of the cylinder bore.

3. A cylinder head for a direct injected internal combustion engine, said cylinder head having a lower surface that is adapted to be held in sealing engagement with an associated cylinder block around its cylinder bore, said cylinder head lower surface being formed with a recessed area that forms, in part, the combustion chamber of the engine, and a fuel injector well formed in said cylinder head and terminating in a cylindrical opening that passes at least in part through said cylinder head combustion chamber surface, the inner peripheral portion of said fuel injector well opening at said cylinder head surface being formed with a relieved part that defines a curved surface that extends at an angle to the axis of said well opening so as to define a surface rather than an edge along this portion of the combustion chamber surface of the cylinder head, said fuel injector having a nozzle portion that extends beyond said fuel injector well opening into said combustion chamber recess of said cylinder head for shielding said curved surface.

4. A cylinder head for a direct injected internal combustion engine as set forth in claim 3 wherein a piston in the cylinder bore of the associated cylinder block has a groove in its head to clear the fuel injector nozzle portion.

5. A cylinder head for a direct injected internal combustion engine, said cylinder head having a lower surface that is adapted to be held in sealing engagement with an associated cylinder block around its cylinder bore, said cylinder head lower surface being formed with a recessed area that forms, in part, the combustion chamber of the engine, and a fuel injector well formed in said cylinder head and terminating in a cylindrical opening that passes at least in part through said cylinder head combustion chamber surface, the inner peripheral portion of said fuel injector well opening at said cylinder head surface being formed with a relieved part that defines a curved surface that extends at an angle to the axis of said well opening so as to define a surface rather than an edge along this portion of the combustion chamber surface of the cylinder head, the combustion chamber side of said curved surface extending radially outwardly beyond the associated cylinder bore so as to be shielded by the associated cylinder block.

6. A cylinder head for a direct injected internal combustion engine as set forth in claim 5 wherein a cylinder head gasket disposed between said cylinder head and the cylinder block has a recess that extends radially outwardly of the curved surface.

7. A cylinder head for a direct injected internal combustion engine as set forth in claim 6 wherein the fuel injector has a nozzle portion that extends beyond the fuel injector well opening into the combustion chamber recess of said cylinder head for shielding the curved surface.

8. A cylinder head for a direct injected internal combustion engine as set forth in claim 7 wherein a piston in the cylinder bore of the associated cylinder block has a groove in its head to clear the fuel injector nozzle portion.

9. A cylinder head for a direct injected internal combustion engine as set forth in claim 8 wherein the curved surface comprises a cylindrical segment.

10. A cylinder head for a direct injected internal combustion engine as set forth in claim 9 wherein the cylindrical segment has its axis parallel to the axis of the cylinder bore.

* * * * *